United States Patent
Guo et al.

(10) Patent No.: US 12,388,361 B2
(45) Date of Patent: Aug. 12, 2025

(54) BATTERY CHARGING CIRCUIT AND METHODS FOR TRICKLE CHARGING AND PRECHARGING A DEAD MULTI-CELL-IN-SERIES BATTERY

(71) Applicant: QUALCOMM Incorporated, San Diego, CA (US)

(72) Inventors: Guoyong Guo, San Jose, CA (US); Cheong Kun, San Diego, CA (US); Chunping Song, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1108 days.

(21) Appl. No.: 17/336,075

(22) Filed: Jun. 1, 2021

(65) Prior Publication Data
US 2021/0376622 A1  Dec. 2, 2021

Related U.S. Application Data

(60) Provisional application No. 63/033,356, filed on Jun. 2, 2020.

(51) Int. Cl.
| | |
|---|---|
| *H02M 3/07* | (2006.01) |
| *H01M 10/44* | (2006.01) |
| *H02J 7/00* | (2006.01) |
| *H02M 1/00* | (2006.01) |
| *H02M 3/158* | (2006.01) |

(52) U.S. Cl.
CPC .......... *H02M 3/07* (2013.01); *H01M 10/441* (2013.01); *H02J 7/007182* (2020.01); *H02M 3/072* (2021.05); *H02J 7/0024* (2013.01); *H02J 2207/20* (2020.01); *H02M 1/0095* (2021.05); *H02M 3/071* (2021.05); *H02M 3/073* (2013.01); *H02M 3/1582* (2013.01)

(58) Field of Classification Search
CPC ...... H02M 3/07; H02M 3/072; H01M 10/441; H02J 7/007182
USPC ......................................................... 320/117
See application file for complete search history.

(56) References Cited

U.S. PATENT DOCUMENTS

| | | | |
|---|---|---|---|
| 3,590,358 A * | 6/1971 | Ruben ............... | H02J 7/007182 320/141 |
| 4,016,473 A | 4/1977 | Newman | |

(Continued)

*Primary Examiner* — John T Trischler
(74) *Attorney, Agent, or Firm* — Patterson + Sheridan, L.L.P.

(57) ABSTRACT

Methods and apparatus for trickle charging and precharging a dead multi-cell-in-series battery. One battery charging circuit generally includes a charge pump circuit comprising a plurality of switches, being coupled to first and second power supply nodes, and being configured to multiply (or divide) a first voltage at the first power supply node to generate a second voltage at the second power supply node; a driver circuit configured to drive the plurality of switches in the charge pump circuit; and an arbiter having a first input coupled to the first power supply node, a second input coupled to the second power supply node, a third input coupled to a third power supply node having a third voltage, and an output coupled to a power supply terminal of the driver circuit. The arbiter is configured to select between the first, second, and third voltages to power the driver circuit.

26 Claims, 7 Drawing Sheets

(56) References Cited

U.S. PATENT DOCUMENTS

| | | | | |
|---|---|---|---|---|
| 4,061,956 A * | 12/1977 | Brown | H02J 7/0047 |
| | | | | 320/160 |
| 4,785,226 A * | 11/1988 | Fujisawa | H02J 7/35 |
| | | | | 320/DIG. 11 |
| 5,225,763 A * | 7/1993 | Krohn | H02J 7/0045 |
| | | | | 320/155 |
| 5,684,384 A | 11/1997 | Barkat et al. | |
| 5,717,318 A * | 2/1998 | Matsuda | H02M 3/07 |
| | | | | 323/273 |
| 5,818,201 A | 10/1998 | Stockstad et al. | |
| 5,832,303 A * | 11/1998 | Murase | H04L 49/254 |
| | | | | 710/36 |
| 6,081,096 A * | 6/2000 | Barkat | H02J 9/061 |
| | | | | 320/124 |
| 6,304,068 B1 * | 10/2001 | Hui | H02M 3/07 |
| | | | | 323/225 |
| 6,304,467 B1 * | 10/2001 | Nebrigic | H02M 3/07 |
| | | | | 363/49 |
| 6,310,789 B1 * | 10/2001 | Nebrigic | H02M 3/07 |
| | | | | 363/60 |
| 6,359,797 B1 * | 3/2002 | Bayer | H02M 1/146 |
| | | | | 363/59 |
| 6,369,619 B1 * | 4/2002 | Kawa | H03K 19/00315 |
| | | | | 327/108 |
| 6,370,046 B1 * | 4/2002 | Nebrigic | H02M 3/07 |
| | | | | 363/59 |
| 6,538,907 B2 * | 3/2003 | Hoshino | H02M 3/07 |
| | | | | 363/60 |
| 6,559,492 B1 * | 5/2003 | Hazucha | H02M 3/07 |
| | | | | 257/691 |
| 6,643,151 B1 * | 11/2003 | Nebrigic | H02M 3/07 |
| | | | | 363/124 |
| 6,661,683 B2 * | 12/2003 | Botker | H02M 3/07 |
| | | | | 363/60 |
| 6,703,891 B2 * | 3/2004 | Tanaka | G11C 5/145 |
| | | | | 327/536 |
| 6,819,573 B2 * | 11/2004 | Hazucha | H02M 3/07 |
| | | | | 363/56.02 |
| 7,129,774 B1 * | 10/2006 | Bosnyak | G11C 29/028 |
| | | | | 327/539 |
| 7,176,654 B2 | 2/2007 | Meyer et al. | |
| 7,260,732 B1 * | 8/2007 | Bittner, Jr. | G06F 1/28 |
| | | | | 713/323 |
| 7,262,580 B2 * | 8/2007 | Meyer | H02J 7/0031 |
| | | | | 320/141 |
| 7,321,219 B2 * | 1/2008 | Meyer | H02J 7/00047 |
| | | | | 320/125 |
| 7,323,847 B2 * | 1/2008 | Meyer | H02J 7/0031 |
| | | | | 320/110 |
| 7,474,141 B2 * | 1/2009 | Huang | H02M 3/07 |
| | | | | 363/59 |
| 7,508,094 B2 * | 3/2009 | Johnson, Jr. | H02J 9/062 |
| | | | | 307/64 |
| 7,508,167 B2 * | 3/2009 | Meyer | H02J 7/0014 |
| | | | | 320/135 |
| 7,612,603 B1 * | 11/2009 | Petricek | H02M 3/07 |
| | | | | 327/306 |
| 7,675,262 B2 * | 3/2010 | Broughton | G05F 1/573 |
| | | | | 323/299 |
| 7,737,658 B2 * | 6/2010 | Sennami | H02J 7/0068 |
| | | | | 320/112 |
| 7,925,906 B2 * | 4/2011 | Ranganathan | G06F 1/26 |
| | | | | 713/320 |
| 7,969,233 B2 * | 6/2011 | Matano | H02M 3/073 |
| | | | | 327/536 |
| 8,018,198 B2 * | 9/2011 | Meyer | H02J 7/0069 |
| | | | | 320/136 |
| 8,040,701 B2 * | 10/2011 | Oyama | H02M 3/07 |
| | | | | 363/60 |
| 8,106,708 B2 * | 1/2012 | Vasani | H03F 1/0244 |
| | | | | 330/261 |
| 8,258,857 B2 * | 9/2012 | Adkins | H02M 3/07 |
| | | | | 327/536 |
| 8,270,189 B2 * | 9/2012 | Walters | H02M 3/073 |
| | | | | 363/59 |
| 8,305,011 B2 * | 11/2012 | Kitagawa | H05B 45/38 |
| | | | | 315/297 |
| 8,427,113 B2 * | 4/2013 | Xing | H02J 7/007182 |
| | | | | 320/140 |
| 8,519,788 B2 * | 8/2013 | Khlat | H03F 3/24 |
| | | | | 330/297 |
| 8,525,479 B2 * | 9/2013 | Meyer | H02J 7/0013 |
| | | | | 320/135 |
| 8,564,918 B2 * | 10/2013 | Gagne | H03K 17/063 |
| | | | | 361/91.1 |
| 8,576,523 B2 * | 11/2013 | Srivastava | H02M 1/32 |
| | | | | 361/118 |
| 8,582,336 B2 * | 11/2013 | Tanaka | H02M 1/4208 |
| | | | | 363/142 |
| 8,723,490 B2 * | 5/2014 | Moussaoui | H02M 3/1588 |
| | | | | 323/284 |
| 8,941,327 B2 * | 1/2015 | Ryu | H05B 45/46 |
| | | | | 315/307 |
| 8,981,839 B2 * | 3/2015 | Kay | G06F 1/263 |
| | | | | 307/43 |
| 9,013,229 B2 * | 4/2015 | Rahman | H02M 3/073 |
| | | | | 327/536 |
| 9,118,189 B2 * | 8/2015 | Meyer | H02J 7/00047 |
| 9,136,756 B2 * | 9/2015 | Liu | H02M 3/07 |
| 9,143,032 B2 * | 9/2015 | Le | H02M 3/07 |
| 9,252,666 B2 * | 2/2016 | Sakita | H02M 3/1584 |
| 9,325,237 B2 * | 4/2016 | Ren | H02M 3/07 |
| 9,350,243 B2 * | 5/2016 | Chen | H02M 3/158 |
| 9,379,604 B2 * | 6/2016 | Zhong | H02M 3/07 |
| 9,401,622 B2 * | 7/2016 | Carobolante | H02J 50/90 |
| 9,413,232 B2 * | 8/2016 | Torres | H02M 3/07 |
| 9,820,354 B2 * | 11/2017 | Kang | H05B 45/60 |
| 9,836,071 B2 * | 12/2017 | Atkinson | H02J 7/0063 |
| 9,858,841 B2 * | 1/2018 | Nishimura | G09G 3/006 |
| 9,871,403 B2 * | 1/2018 | Sotani | H01L 31/02021 |
| 9,917,510 B2 * | 3/2018 | Ahmed | H02M 3/07 |
| 9,964,986 B2 * | 5/2018 | Rueger | G05F 3/262 |
| 10,008,864 B2 * | 6/2018 | Meyer | H02J 7/00711 |
| 10,050,522 B2 * | 8/2018 | Scheel | H02M 3/073 |
| 10,063,139 B2 * | 8/2018 | Le | H02M 3/07 |
| 10,250,057 B2 * | 4/2019 | Zhao | H02J 7/0068 |
| 10,361,581 B2 * | 7/2019 | Maalouf | H02J 7/007182 |
| 10,374,443 B2 * | 8/2019 | Meyer | H02J 7/0048 |
| 10,389,235 B2 * | 8/2019 | Giuliano | H02M 3/1582 |
| 10,404,086 B2 * | 9/2019 | Wu | H02J 7/02 |
| 10,404,175 B2 * | 9/2019 | Chakraborty | H02M 3/158 |
| 10,424,956 B2 * | 9/2019 | Ghabra | H02J 7/0048 |
| 10,424,957 B2 * | 9/2019 | Ghabra | H02J 7/342 |
| 10,447,152 B2 * | 10/2019 | Zhang | H02M 7/4837 |
| 10,468,898 B2 * | 11/2019 | Crosby, II | H02M 3/158 |
| 10,516,284 B2 | 12/2019 | Maalouf et al. | |
| 10,523,115 B2 * | 12/2019 | Scheel | H02M 3/073 |
| 10,560,017 B2 * | 2/2020 | Muramatsu | G05F 1/10 |
| 10,615,697 B1 * | 4/2020 | Ferrari | H02M 3/1584 |
| 10,714,948 B2 * | 7/2020 | Meyer | H02J 7/007194 |
| 10,734,826 B2 * | 8/2020 | Zhao | H02J 7/02 |
| 10,734,891 B2 * | 8/2020 | Oporta | H02J 7/02 |
| 10,749,218 B2 * | 8/2020 | Hawley | H02M 3/1584 |
| 10,763,754 B2 * | 9/2020 | Oouchi | H02J 7/0013 |
| 10,790,672 B2 * | 9/2020 | Jury | H02J 1/108 |
| 10,790,689 B2 * | 9/2020 | Krishna | H02J 7/00714 |
| 10,802,523 B2 * | 10/2020 | Londak | G05F 1/565 |
| 10,868,429 B2 * | 12/2020 | Li | H02M 3/07 |
| 10,903,738 B2 * | 1/2021 | Zhang | H02M 3/07 |
| 11,018,582 B2 * | 5/2021 | Bandyopadhyay | H02M 3/158 |
| 11,063,446 B2 * | 7/2021 | Meyer | H02J 7/00036 |
| 11,101,674 B2 * | 8/2021 | Walley | H02J 7/00 |
| 11,112,844 B2 * | 9/2021 | Sporck | G06F 13/4022 |
| 11,171,493 B2 * | 11/2021 | Kun | H02M 3/158 |
| 11,290,027 B1 * | 3/2022 | Han | H02J 7/02 |
| 11,309,716 B2 * | 4/2022 | Li | H02M 7/219 |
| 11,316,424 B2 * | 4/2022 | Giuliano | H02M 3/07 |
| 11,424,629 B1 * | 8/2022 | Han | H01M 10/441 |
| 11,435,769 B2 * | 9/2022 | Londak | G05F 1/565 |

(56) References Cited

U.S. PATENT DOCUMENTS

| | | | | |
|---|---|---|---|---|
| 11,502,535 B2* | 11/2022 | Tian | | H02M 3/07 |
| 11,502,599 B2* | 11/2022 | Yen | | H02M 3/07 |
| 11,522,466 B1* | 12/2022 | Li | | H02M 7/4837 |
| 11,527,951 B2* | 12/2022 | Jing | | H02M 3/07 |
| 11,532,987 B2* | 12/2022 | Han | | H02M 1/0058 |
| 11,545,897 B2* | 1/2023 | Yen | | H02J 7/007 |
| 11,557,964 B2* | 1/2023 | Pullen | | H02M 1/15 |
| 11,563,337 B2* | 1/2023 | Yuan | | H02J 50/12 |
| 11,601,051 B2* | 3/2023 | Yu | | H02M 7/483 |
| 11,606,032 B2* | 3/2023 | Song | | H02M 3/1582 |
| 11,621,638 B1* | 4/2023 | Zhang | | H02M 3/07 323/271 |
| 11,650,644 B2* | 5/2023 | Sporck | | G06F 13/4282 710/313 |
| 11,677,260 B2* | 6/2023 | Li | | H02J 7/342 320/116 |
| 11,695,334 B2* | 7/2023 | Liu | | H02M 3/072 363/60 |
| 11,705,812 B2* | 7/2023 | Yen | | H02M 1/15 323/282 |
| 11,742,756 B2* | 8/2023 | Kumar | | H02M 3/07 323/282 |
| 11,777,396 B2* | 10/2023 | Liu | | H02M 3/1582 363/13 |
| 11,791,721 B2* | 10/2023 | Chen | | H02J 7/007 713/300 |
| 11,791,723 B2* | 10/2023 | Giuliano | | H02M 3/07 363/60 |
| 11,831,241 B2* | 11/2023 | Jung | | H02M 1/0032 |
| 11,837,887 B2* | 12/2023 | Cho | | H02M 3/158 |
| 11,855,536 B2* | 12/2023 | Giuliano | | H02M 3/07 |
| 11,923,715 B2* | 3/2024 | Song | | H02M 3/33584 |
| 12,021,402 B2* | 6/2024 | Liu | | H02J 7/0016 |
| 12,051,972 B2* | 7/2024 | Ausseresse | | H02M 3/33571 |
| 12,101,020 B2* | 9/2024 | Huang | | H02M 3/1582 |
| 2001/0033501 A1* | 10/2001 | Nebrigic | | H02M 3/1588 363/49 |
| 2002/0014908 A1* | 2/2002 | Lauterbach | | G11C 5/145 327/536 |
| 2002/0051372 A1* | 5/2002 | Hoshino | | H02M 3/07 363/60 |
| 2003/0085418 A1* | 5/2003 | Hazucha | | H02M 3/07 257/299 |
| 2003/0174003 A1* | 9/2003 | Nogami | | H03K 5/04 327/156 |
| 2003/0174524 A1* | 9/2003 | Botker | | H02M 3/07 363/60 |
| 2004/0145919 A1* | 7/2004 | Hazucha | | H02M 3/07 363/17 |
| 2004/0227490 A1* | 11/2004 | MacNair, Jr. | | H02J 7/0069 320/132 |
| 2004/0263119 A1* | 12/2004 | Meyer | | H02J 7/0042 320/116 |
| 2005/0162131 A1* | 7/2005 | Sennami | | H01M 50/269 320/128 |
| 2006/0108975 A1* | 5/2006 | Meyer | | H02J 7/00038 320/107 |
| 2006/0108983 A1* | 5/2006 | Meyer | | H02J 7/0014 320/128 |
| 2006/0250122 A1* | 11/2006 | Broughton | | G05F 1/573 323/299 |
| 2007/0103109 A1* | 5/2007 | Meyer | | H02J 7/0036 320/103 |
| 2007/0216228 A1* | 9/2007 | Johnson, Jr. | | H02J 9/062 307/64 |
| 2007/0273334 A1* | 11/2007 | Meyer | | H02J 7/0048 320/145 |
| 2008/0036432 A1* | 2/2008 | Takada | | H02J 7/34 320/137 |
| 2008/0042729 A1* | 2/2008 | Huang | | H02M 3/07 327/536 |
| 2008/0054855 A1* | 3/2008 | Hussain | | H02J 7/0068 320/162 |
| 2008/0303584 A1* | 12/2008 | Walters | | H02M 3/073 327/536 |
| 2009/0027022 A1* | 1/2009 | Oyama | | H02M 3/07 327/536 |
| 2009/0033289 A1* | 2/2009 | Xing | | H02J 7/007182 320/140 |
| 2009/0033293 A1* | 2/2009 | Xing | | H02J 7/00712 323/284 |
| 2009/0153101 A1* | 6/2009 | Meyer | | H02J 7/00038 320/119 |
| 2009/0323378 A1* | 12/2009 | Melse | | H02M 3/07 363/60 |
| 2009/0326624 A1* | 12/2009 | Melse | | A61N 1/378 607/116 |
| 2010/0073077 A1* | 3/2010 | Matano | | H02M 3/073 327/536 |
| 2010/0194294 A1* | 8/2010 | Kitagawa | | H05B 45/38 315/161 |
| 2010/0321193 A1* | 12/2010 | Liao | | H02J 7/0048 340/657 |
| 2011/0316634 A1* | 12/2011 | Vasani | | H03F 1/0244 330/296 |
| 2012/0001596 A1* | 1/2012 | Meyer | | H02J 7/00306 320/125 |
| 2012/0001599 A1* | 1/2012 | Tanaka | | H02M 1/4208 323/205 |
| 2012/0049772 A1* | 3/2012 | Moussaoui | | H02M 3/1588 318/376 |
| 2012/0049936 A1* | 3/2012 | Adkins | | H02M 3/07 327/536 |
| 2012/0206845 A1* | 8/2012 | Gagne | | H03K 17/063 361/86 |
| 2012/0212141 A1* | 8/2012 | Ryu | | H05B 45/347 315/186 |
| 2012/0212293 A1* | 8/2012 | Khlat | | H03F 3/24 330/127 |
| 2012/0235730 A1* | 9/2012 | Quan | | H02M 3/07 327/536 |
| 2012/0236444 A1* | 9/2012 | Srivastava | | H03F 1/52 361/56 |
| 2012/0274394 A1* | 11/2012 | Chan | | H02M 3/07 327/536 |
| 2012/0313701 A1* | 12/2012 | Khlat | | H02M 3/07 330/127 |
| 2013/0020960 A1* | 1/2013 | Ren | | H02M 3/07 327/536 |
| 2013/0113430 A1* | 5/2013 | Kim | | H02J 7/0032 320/136 |
| 2013/0162230 A1* | 6/2013 | Miyamae | | H02M 3/158 323/271 |
| 2013/0300385 A1* | 11/2013 | Li | | H02M 3/07 323/271 |
| 2013/0328613 A1* | 12/2013 | Kay | | G06F 1/263 327/427 |
| 2013/0335012 A1* | 12/2013 | Meyer | | H02J 7/0013 320/107 |
| 2014/0210402 A1* | 7/2014 | Sakita | | H02M 3/1584 320/107 |
| 2014/0210436 A1* | 7/2014 | Zhong | | H02M 3/07 323/271 |
| 2014/0268946 A1* | 9/2014 | Liu | | H02M 3/07 363/60 |
| 2014/0306648 A1* | 10/2014 | Le | | H02M 3/07 323/266 |
| 2014/0306673 A1* | 10/2014 | Le | | H02M 3/158 323/266 |
| 2015/0015323 A1* | 1/2015 | Rahman | | H02M 3/07 327/536 |
| 2015/0028801 A1* | 1/2015 | Carobolante | | H02J 50/60 320/108 |
| 2015/0028803 A1* | 1/2015 | Shevde | | H02J 50/90 320/108 |
| 2015/0145497 A1* | 5/2015 | Torres | | H02M 3/07 323/283 |

(56) References Cited

U.S. PATENT DOCUMENTS

| | | | |
|---|---|---|---|
| 2015/0207401 A1* | 7/2015 | Zhang | H02M 3/07 323/271 |
| 2015/0303803 A1* | 10/2015 | Chen | H02M 3/158 323/271 |
| 2015/0311720 A1* | 10/2015 | Zhao | H02J 7/0068 307/43 |
| 2015/0340887 A1* | 11/2015 | Meyer | H02J 7/0045 320/112 |
| 2015/0381035 A1* | 12/2015 | Torres | H02M 3/16 327/536 |
| 2015/0381053 A1* | 12/2015 | Mittermaier | H02J 7/345 323/271 |
| 2016/0094084 A1* | 3/2016 | Sotani | H01L 31/02021 320/101 |
| 2016/0240130 A1* | 8/2016 | Nishimura | G09G 3/006 |
| 2016/0241142 A1* | 8/2016 | Scheel | H02M 3/073 |
| 2017/0055327 A1* | 2/2017 | Kang | F21V 29/745 |
| 2017/0126041 A1* | 5/2017 | Sato | H02J 7/02 |
| 2017/0179715 A1* | 6/2017 | Huang | H02M 3/155 |
| 2017/0185094 A1* | 6/2017 | Atkinson | G06F 1/3243 |
| 2017/0185096 A1* | 6/2017 | Rueger | G05F 3/262 |
| 2017/0237274 A1* | 8/2017 | Lazarev | H02J 3/28 320/166 |
| 2017/0244318 A1* | 8/2017 | Giuliano | H02M 3/07 |
| 2017/0256956 A1* | 9/2017 | Irish | H02M 7/217 |
| 2017/0256958 A1* | 9/2017 | Irish | H02M 7/483 |
| 2017/0352403 A1* | 12/2017 | Lee | G11C 13/0004 |
| 2017/0358987 A1* | 12/2017 | Oouchi | B60L 53/22 |
| 2018/0013303 A1* | 1/2018 | Wu | H02J 7/02 |
| 2018/0019665 A1* | 1/2018 | Zhang | H02M 7/483 |
| 2018/0026526 A1* | 1/2018 | Ahmed | H02M 3/07 323/271 |
| 2018/0034289 A1* | 2/2018 | Meyer | H02J 7/0013 |
| 2018/0041060 A1* | 2/2018 | Walley | H02J 7/02 |
| 2018/0076635 A1* | 3/2018 | Maalouf | H02J 7/02 |
| 2018/0091044 A1* | 3/2018 | Salem | H02M 3/07 |
| 2018/0138735 A1* | 5/2018 | Maalouf | H02J 50/12 |
| 2018/0145517 A1* | 5/2018 | Krishna | H02J 7/007182 |
| 2018/0205231 A1* | 7/2018 | Jury | H02J 3/38 |
| 2018/0234011 A1* | 8/2018 | Muramatsu | H02M 3/073 |
| 2018/0278549 A1* | 9/2018 | Mula | H04L 47/39 |
| 2018/0309304 A1* | 10/2018 | Meyer | H02J 7/0036 |
| 2018/0337545 A1* | 11/2018 | Crosby, II | H02J 7/00712 |
| 2018/0341309 A1* | 11/2018 | Sporck | G06F 13/4295 |
| 2018/0366965 A1* | 12/2018 | Ghabra | B60R 25/406 |
| 2019/0089244 A1* | 3/2019 | Koski | H02M 3/07 |
| 2019/0115765 A1* | 4/2019 | Lai | H02J 7/00712 |
| 2019/0115829 A1* | 4/2019 | Oporta | H02J 7/02 |
| 2019/0140537 A1* | 5/2019 | Scheel | H02M 3/073 |
| 2019/0148795 A1* | 5/2019 | Hawley | H01M 10/441 320/134 |
| 2019/0173307 A1* | 6/2019 | Zhao | H02J 7/00 |
| 2019/0190284 A1* | 6/2019 | Pinto | H02J 7/00 |
| 2019/0207519 A1* | 7/2019 | Chakraborty | H02M 1/36 |
| 2019/0237982 A1* | 8/2019 | Ghabra | B60R 25/406 |
| 2019/0348849 A1* | 11/2019 | Kun | H02M 3/158 |
| 2019/0348913 A1* | 11/2019 | Zhang | H02M 3/07 |
| 2019/0356142 A1* | 11/2019 | Meyer | H02J 7/00038 |
| 2019/0356149 A1* | 11/2019 | Li | H02M 3/33576 |
| 2019/0386481 A1* | 12/2019 | Cho | G01R 19/16571 |
| 2019/0393777 A1* | 12/2019 | Giuliano | H02M 3/1582 |
| 2020/0036218 A1* | 1/2020 | Maalouf | H02J 50/10 |
| 2020/0127467 A1* | 4/2020 | Li | H02J 7/342 |
| 2020/0136508 A1* | 4/2020 | Bandyopadhyay | H03K 5/24 |
| 2020/0161976 A1* | 5/2020 | Song | H02M 3/158 |
| 2020/0185923 A1* | 6/2020 | Yang | H02J 3/381 |
| 2020/0228006 A1* | 7/2020 | Scheel | H02M 3/073 |
| 2020/0266634 A9* | 8/2020 | Lai | H02J 7/02 |
| 2020/0285260 A1* | 9/2020 | Londak | G05F 1/575 |
| 2020/0303927 A1* | 9/2020 | Tian | H02M 3/07 |
| 2020/0343740 A1* | 10/2020 | Meyer | H02J 7/0048 |
| 2020/0366120 A1* | 11/2020 | Yuan | H02J 50/12 |
| 2020/0373844 A1* | 11/2020 | Ausseresse | H02M 3/07 |
| 2020/0403514 A1* | 12/2020 | Yu | H02M 3/07 |
| 2020/0409403 A1* | 12/2020 | Londak | G05F 1/575 |
| 2021/0067041 A1* | 3/2021 | Cho | H02M 3/156 |
| 2021/0075223 A1* | 3/2021 | Li | H02M 3/1588 |
| 2021/0083572 A1* | 3/2021 | Yen | H02J 7/06 |
| 2021/0083573 A1* | 3/2021 | Yen | H02M 3/07 |
| 2021/0111570 A1* | 4/2021 | Cho | H02J 7/007192 |
| 2021/0194266 A1* | 6/2021 | Song | H02J 7/007192 |
| 2021/0194358 A1* | 6/2021 | Jing | H02M 1/36 |
| 2021/0242771 A1* | 8/2021 | Chen | H02J 7/0068 |
| 2021/0336450 A1* | 10/2021 | Meyer | H02J 7/00309 |
| 2021/0359606 A1* | 11/2021 | Han | H02M 1/0054 |
| 2021/0376719 A1* | 12/2021 | Pullen | G06F 1/3206 |
| 2021/0382535 A1* | 12/2021 | Sporck | G06F 13/385 |
| 2021/0408818 A1* | 12/2021 | Yang | H02J 50/12 |
| 2022/0094277 A1* | 3/2022 | Han | H02J 7/02 |
| 2022/0181907 A1* | 6/2022 | Kasper | H02M 3/1584 |
| 2022/0190714 A1* | 6/2022 | Ye | H02M 1/007 |
| 2022/0224123 A1* | 7/2022 | Li | H02J 7/02 |
| 2022/0224229 A1* | 7/2022 | Giuliano | H02M 3/1582 |
| 2022/0231518 A1* | 7/2022 | Kun | H02M 1/0054 |
| 2022/0255433 A1* | 8/2022 | Wen | H02M 3/158 |
| 2022/0311339 A1* | 9/2022 | Yen | H02M 3/158 |
| 2022/0337078 A1* | 10/2022 | Shao | H02M 3/07 |
| 2022/0396167 A1* | 12/2022 | Sharifipour | B60L 53/51 |
| 2023/0006555 A1* | 1/2023 | Jung | H02M 3/07 |
| 2023/0013025 A1* | 1/2023 | Kumar | H02M 1/0095 |
| 2023/0024417 A1* | 1/2023 | Yamaguchi | H02J 7/00714 |
| 2023/0026736 A1* | 1/2023 | Liu | H02M 1/0095 |
| 2023/0047446 A1* | 2/2023 | Liu | H02M 1/007 |
| 2023/0066436 A1* | 3/2023 | Rutkowski | H02J 1/08 |
| 2023/0088177 A1* | 3/2023 | Giuliano | H02M 1/0058 363/60 |
| 2023/0089638 A1* | 3/2023 | Liu | H02M 3/072 320/106 |
| 2023/0097692 A1* | 3/2023 | Liu | H02M 3/158 363/60 |
| 2023/0102466 A1* | 3/2023 | Huang | H02M 3/1582 323/282 |
| 2023/0283096 A1* | 9/2023 | Kun | H02J 50/10 320/140 |
| 2023/0318340 A9* | 10/2023 | Shao | H02M 3/07 307/23 |
| 2023/0387800 A1* | 11/2023 | Govindarajulu | H02M 3/1582 |
| 2023/0387801 A1* | 11/2023 | Govindarajulu | H02M 3/158 |
| 2023/0412074 A1* | 12/2023 | Giuliano | H02M 1/42 |
| 2024/0055992 A1* | 2/2024 | Jung | H02M 1/0032 |
| 2024/0079883 A1* | 3/2024 | Cho | H02J 50/80 |
| 2024/0088789 A1* | 3/2024 | Giuliano | H02M 3/07 |

* cited by examiner

BATTERY CHARGING CIRCUIT AND METHODS FOR TRICKLE CHARGING AND PRECHARGING A DEAD MULTI-CELL-IN-SERIES BATTERY

CROSS-REFERENCE TO RELATED APPLICATION(S)

This application claims the benefit of priority to U.S. Provisional Application No. 63/033,356, entitled "Trickle Charging a Multi-Cell-in-Series Dead Battery" and filed Jun. 2, 2020, which is expressly incorporated by reference herein in its entirety as if fully set forth below and for all applicable purposes.

TECHNICAL FIELD

Certain aspects of the present disclosure generally relate to electronic circuits and, more particularly, to methods and apparatus for charging a dead multi-cell-in-series battery.

BACKGROUND

A voltage regulator ideally provides a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator (also known as a "switching converter" or "switcher") may be implemented, for example, by a switched-mode power supply (SMPS), such as a buck converter, a boost converter, a buck-boost converter, or a charge pump.

For example, a buck converter is a type of SMPS typically comprising: (1) a high-side switch coupled between a relatively higher voltage rail and a switching node, (2) a low-side switch coupled between the switching node and a relatively lower voltage rail, (3) and an inductor coupled between the switching node and a load (e.g., represented by a shunt capacitive element). The high-side and low-side switches are typically implemented with transistors, although the low-side switch may alternatively be implemented with a diode.

A charge pump is a type of SMPS typically comprising at least one switching device to control the connection of a supply voltage across a load through a capacitor. In a voltage doubler (also referred to as a "multiply-by-two (X2) charge pump"), for example, the capacitor of the charge pump circuit may initially be connected across the supply, charging the capacitor to the supply voltage. The charge pump circuit may then be reconfigured to connect the capacitor in series with the supply and the load, doubling the voltage across the load. This two-stage cycle is repeated at the switching frequency for the charge pump. Charge pumps may be used to multiply or divide voltages by integer or fractional amounts, depending on the circuit topology.

Power management integrated circuits (power management ICs or PMICs) are used for managing the power scheme of a host system and may include and/or control one or more voltage regulators (e.g., buck converters and/or charge pumps). A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features are discussed briefly below. After considering this discussion, and particularly after reading the section entitled "Detailed Description," one will understand how the features of this disclosure provide the advantages described herein.

Certain aspects of the present disclosure generally relate to methods and apparatus for charging a dead multi-cell-in-series battery, such as trickle charging such a battery using a charge pump.

Certain aspects of the present disclosure are directed to a battery charging circuit. The battery charging circuit generally includes a charge pump circuit comprising a plurality of switches and a capacitive element, being coupled to a first power supply node and a second power supply node, and being configured to at least one of: multiply a first voltage at the first power supply node to generate a second voltage at the second power supply node; or divide the second voltage at the second power supply node to generate the first voltage at the first power supply node; a driver circuit coupled to the charge pump circuit and configured to drive the plurality of switches in the charge pump circuit; and an arbiter having a first input coupled to the first power supply node, a second input coupled to the second power supply node, a third input coupled to a third power supply node having a third voltage, and an output coupled to a power supply terminal of the driver circuit, the arbiter being configured to select between the first voltage, the second voltage, and the third voltage to power the driver circuit Certain aspects of the present disclosure are directed to a power supply system comprising the battery charging circuit described herein. The power supply system further includes a power management circuit, the power management circuit having a switched-mode power supply circuit with an output coupled to the first power supply node of the battery charging circuit.

Certain aspects of the present disclosure are directed to a wireless device comprising the battery charging circuit described herein. The wireless device further includes a multi-cell battery coupled to the second power supply node of the battery charging circuit.

Certain aspects of the present disclosure are directed to a method of supplying power. The method generally includes selecting between a first voltage at a first power supply node, a second voltage at a second power supply node, and a third voltage at a third power supply node to power a driver circuit coupled to a charge pump circuit; and operating at least a portion of the driver circuit powered using the selected first, second, or third voltage.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
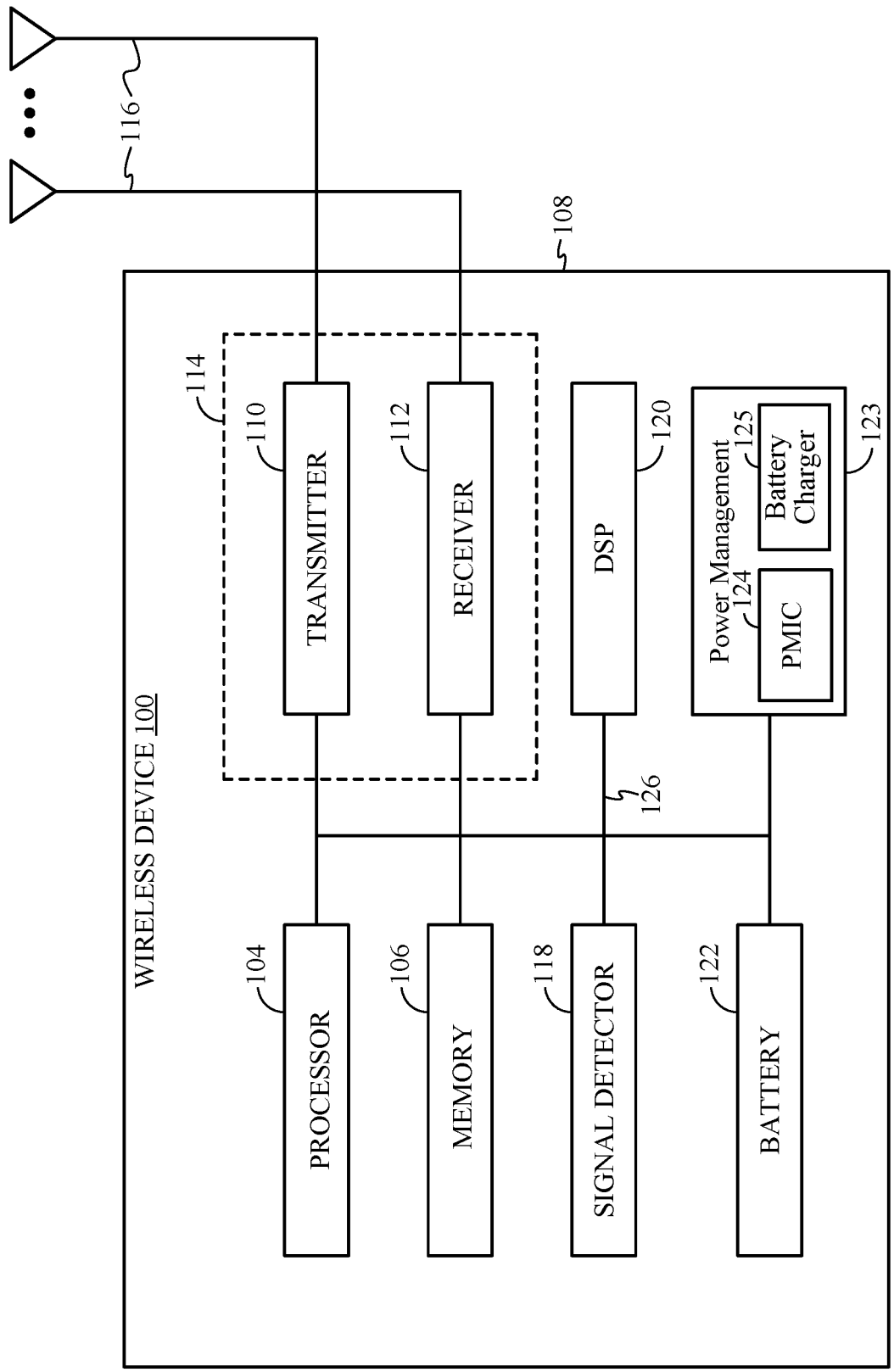
FIG. 1 is a block diagram of an example device comprising a power management system that includes a power supply circuit and a battery charging circuit, in accordance with certain aspects of the present disclosure.

Certain aspects of the present disclosure provide techniques and apparatus for charging a dead multi-cell-in-series battery, such as trickle charging such a battery using a charge pump.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, a wearable device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122, which may be used to power the various components of the device 100 (e.g., when another power source—such as a wall adapter or a wireless power charger—is unavailable). The battery 122 may comprise a single cell or multiple cells connected in series. The device 100 may also include a power management system 123 for managing the power from the battery 122, a wall adapter, and/or a wireless power charger to the various components of the device 100. The power management system 123 may perform a variety of functions for the device such as DC-to-DC conversion, battery charging, power-source selection, voltage scaling, power sequencing, etc. In certain aspects, the power management system 123 may include a power management integrated circuit (power management IC or PMIC) 124 and one or more power supply circuits, such as a battery charger 125, which may be controlled by the PMIC. For certain aspects, at least a portion of one or more of the power supply circuits may be integrated in the PMIC 124. The PMIC 124 and the one or more power supply circuits may include at least a portion of a switched-mode power supply (SMPS) circuit, which may be implemented by any of various suitable SMPS circuit topologies, such as a buck converter, a buck-boost converter, a three-level buck converter, or a charge pump, such as a multiply-by-two (X2) or multiply-by-three (X3) charge pump.

The various components of the device 100 may be coupled together by a bus system 126, which may include a power bus, a control signal bus, and/or a status signal bus in addition to a data bus.

Example Trickle Charging Schemes

Battery charging systems (e.g., the battery charger 125 of FIG. 1) are trending towards higher charging current, which leads to the desire for higher efficiency converters that can operate over a wider battery voltage range. To reduce thermal issues and/or conserve power, it may be desirable to operate such battery charging systems with higher efficiency.

In one example parallel charging solution, the master charger is implemented based on a buck converter topology. The master charger is capable of charging the battery (e.g., the battery 122) and providing power by itself or may be paralleled with one or more slave chargers. Each of the slave chargers may be implemented, for example, as a switched-capacitor converter (e.g., a divide-by-two (Div2) charge pump) or a switched-mode power supply (SMPS) topology using an inductor (e.g., a buck converter). Charge pump converters may provide a more efficient alternative than buck converters.

Compared with single-cell (1S) battery charging, charging a two-cell-in-series (2S) battery stores two times the power in the battery with the same charging current, thereby offering double the charging rate. A power supply system for charging a 2S battery may include, for example, a buck charger followed by a boost charger, or a buck charger followed by a charge pump capable of voltage multiplying by two (X2). Such a X2 charge pump may also be capable of dividing by two (Div2) when discharging the 2S battery in the opposite direction (i.e., in reverse). Hence, a battery charging circuit with this multiply-by-two and divide-by-two charge pump capability may be referred to as an "X2/D2" circuit or chip. The power source for the X2/D2 circuit may come from a first power supply node, which may come from a buck converter in a power management circuit (e.g., the PMIC 124), or from a second power supply node, which may come from the 2S battery.

When the 2S battery is dead, the battery may be recharged. However, trying to fast charge a dead battery may introduce a high current that may damage the battery and/or shorten the life of the battery. Therefore, trickle charging may be used to more slowly charge a dead battery. Trickle charging typically involves applying a continuous constant-current charge at a low rate.

Figure 2A:
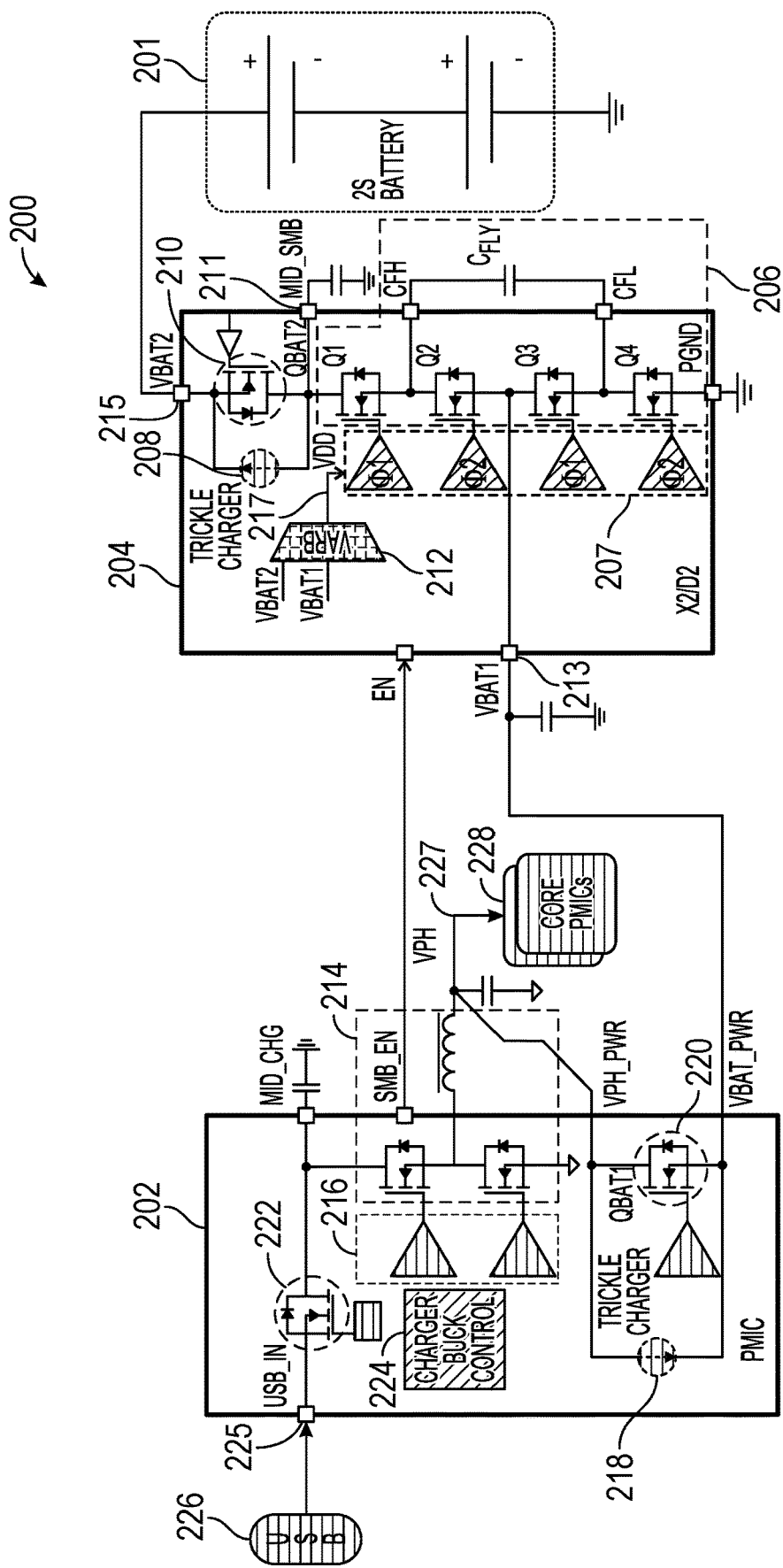
FIG. 2A is a schematic diagram of an example power supply system capable of trickle charging a dead battery using a battery charging circuit with a trickle charger, a battery switch, and two alternative power supply rails.

FIG. 2A is a schematic diagram of an example power supply system 200 capable of trickle charging a dead multi-cell battery 201 (e.g., a 2S battery). The power supply system 200 includes a power management circuit 202 (e.g., a PMIC 124) and a battery charging circuit 204 (e.g., battery charger 125, such as an X2/D2 chip).

The power management circuit 202 may include a switched-mode power supply (SMPS) 214, gate drivers 216, a first battery switch 220 (e.g., transistor QBAT1), a reverse blocking transistor 222, and control logic 224. For certain aspects, the SMPS 214 may also include an optional trickle charger 218 in parallel with the first battery switch 220. The SMPS 214 may be implemented by any of various suitable switching regulators, such as a two-level buck converter (as illustrated in FIG. 2A) or a three-level buck converter. The control logic 224 may control the gate drivers 216, which may provide level-shifted outputs to the gates of the power transistors implementing the SMPS 214. The control logic 224 may also control the reverse blocking transistor 222 and/or the first battery switch 220. The SMPS 214 may receive power at an input power node 225 (labeled "USB_IN") from one of multiple potential power sources, such as a wall adapter or other power cable (e.g., a Universal Serial Bus (USB) adapter) connected via USB port 226 or a wireless power charger (not shown). The output of the SMPS 214 at system power node 227 (labeled "VPH," but also referred to as "VPH_PWR") may provide power to one or more core PMICs 228 and/or other circuits within a device (e.g., device 100). The first battery switch 220 may be coupled between the system power node 227 and a first power supply node 213 (labeled "VBAT1," but also referred to as "VBAT_PWR") for the battery charging circuit 204.

The battery charging circuit 204 in FIG. 2A may include a charge pump circuit 206, a driver circuit 207, a trickle charger 208, a second battery switch 210 (e.g., transistor QBAT2), and an arbiter 212. The second battery switch 210 and the trickle charger 208 may be coupled in parallel between the charge pump circuit 206 and a second power supply node 215 (labeled "VBAT2") for the battery charging circuit 204. The second power supply node 214 may be coupled to the battery 201. The arbiter 212 may be configured to select between two alternative power supply rails (e.g., VBAT1 and VBAT2) for powering gate drivers in the driver circuit 207, as described below.

While the charge pump circuit 206 is generally described herein with the example of an X2/D2 charge pump, it is to be understood that the charge pump circuit 206 may be implemented with other configurations, such as an X3/D3 charge pump. The charge pump circuit 206 may include a plurality of switches (which may be implemented by a first transistor Q1, a second transistor Q2, a third transistor Q3, and a fourth transistor Q4 as shown) and a flying capacitive element Cfly. Transistor Q2 may be coupled to transistor Q1 via a first node (labeled "CFH"), transistor Q3 may be coupled to transistor Q2 via a second node (which may also be or be coupled to the first power supply node 213 having voltage VBAT1), and transistor Q4 may be coupled to transistor Q3 via a third node (labeled "CFL"). For certain aspects, the transistors Q1-Q4 may be implemented as n-type metal-oxide-semiconductor (NMOS) transistors, as illustrated in FIG. 2A. In this case, the drain of transistor Q2 may be coupled to the source of transistor Q1, the drain of transistor Q3 may be coupled to the source of transistor Q2, and the drain of transistor Q4 may be coupled to the source of transistor Q3. The source of transistor Q4 may be coupled to a reference potential node (e.g., electrical ground, labeled "PGND") for the circuit. The flying capacitive element Cfly may have a first terminal coupled to the first node (CFH) and have a second terminal coupled to the third node (CFL).

Control logic (not shown) may control operation of the charge pump circuit 206 in the battery charger. For example, the control logic may control operation of transistors Q1-Q4 via output signals to the inputs of respective gate drivers in the driver circuit 207. The outputs of the gate drivers are coupled to respective gates of transistors Q1-Q4. The gate drivers may each receive power at a power supply terminal coupled to a common power supply node 217 (labeled "VDD"). Inputs to the arbiter 212 may be coupled to the first power supply node 213 (VBAT1) and to the second power supply node 215 (VBAT2), and the control logic may control the arbiter 212 to select which power level to output at the common power supply node 217.

The control logic may control operation of the charge pump circuit 206 to cycle through different phases Φ1 and Φ2, with various combinations of transistors Q1-Q4 in different open and closed states. During Φ2, transistors Q2 and Q4 are closed, while transistor Q1 and Q3 are open, thereby charging flying capacitive element Cfly to VBAT1 from CFH to CFL. During Φ1, transistors Q1 and Q3 are closed, while transistors Q2 and Q4 are open, thereby bootstrapping VBAT2 at the second power supply node 215 to 2*VBAT1 by adding the voltage across the flying capacitive element Cfly to the voltage at the first power supply node 213. In this manner, the charge pump circuit 206 acts as an X2 charge pump.

Figure 2B:
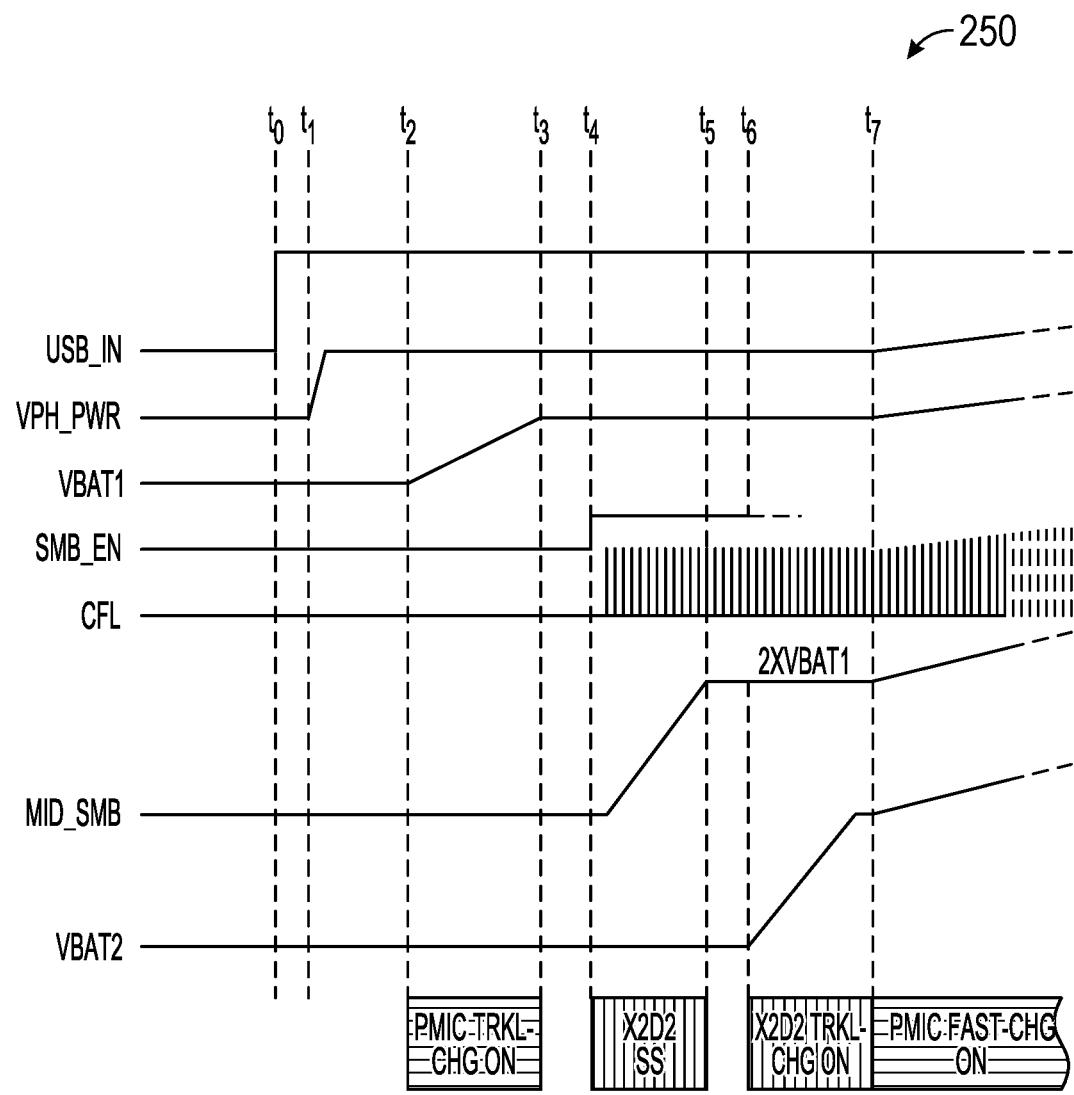
FIG. 2B is a timing diagram illustrating trickle charging the dead battery using the power supply system of FIG. 2A.

FIG. 2B is a timing diagram 250 illustrating trickle charging a dead multi-cell battery 201 (e.g., a dead 2S battery) using the power supply system 200 of FIG. 2A. Initially, VBAT1 and VBAT2=0 V (dead battery), and then at time $t_0$, a power source capable of charging the multi-cell battery 201 is provided. For example, a user may plug in a wall adapter or other power cable (e.g., USB)). At time $t_1$, the power management circuit 202 may bring up VPH_PWR to boot the system, using the buck converter illustrated in FIG. 2A, for example. For certain aspects, the power management circuit 202 trickle charges up VBAT_PWR (VBAT1 for the battery charger) starting at time $t_2$ using the trickle charger 218 in the power management circuit. For other aspects, the power management circuit 202 may quickly bring up VBAT_PWR (VBAT1) (e.g., without using the trickle charger 218 or when the trickle charger is not present).

The battery charging circuit 204 may have an undervoltage lockout (UVLO) threshold voltage. At time $t_3$ when VBAT1 is greater than the UVLO threshold, the power management circuit 202 may enable the battery charging circuit 204 (via transition of an enable signal, such as SMB_EN, at time $t_4$) to soft start and bring up an intermediate voltage (e.g., MID_MB) at node 211, with the second battery switch 210 open (e.g., with transistor QBAT2 off). For certain aspects, the battery charging circuit 204 may most likely not directly soft-start into the dead multi-cell battery 201. Rather, trickle charging the multi-cell battery 201 may utilize a well-controlled low current. After the intermediate voltage (e.g., MID_SMB) reaches 2×VBAT1 for a 2S battery (or N×VBAT1 for a battery with N cells) at time $t_5$, the trickle charger 208 may be turned on at time $t_6$ to trickle charge the multi-cell battery 201 and bring up VBAT2 (i.e., increase the voltage of VBAT2). After VBAT2 reaches 2×VBAT1 for a 2S battery (or N×VBAT1 for battery with N cells), the battery charging circuit 204 may close the second battery switch (e.g., turn on transistor QBAT2) at time $t_7$ and may notify the power management circuit 202 to start normal charging (e.g., fast charging). Therefore, trickle charging in this manner involves four states: power management circuit trickle charging between times $t_2$ and $t_3$, battery charger soft start between times $t_4$ and $t_5$, battery charger trickle charging between times $t_6$ and $t_7$, and normal charging (e.g., fast charging) after time $t_7$.

Trickle charging using the power supply system 200 may not be as ideal as possible. For example, the battery charging circuit 204 in FIG. 2A has a second battery switch 210 (e.g., transistor QBAT2), which occupies extra area. Furthermore, the on-resistance of transistor QBAT2 may be associated with power loss during discharging of the multi-cell battery 201. In other words, when the multi-cell battery 201 is powering the device (providing power to the system power node 227 (VPH_PWR)) instead of a wall adapter, USB, or other external source), the on-resistance of transistor QBAT2 dissipates some power. Furthermore, the battery charging circuit 204 in FIG. 2A has a trickle charger 208, which occupies semiconductor space and adds costs to the battery charging circuit. Moreover, this trickle-charging scheme may be considered to be complicated, involving back-and-forth handshaking between the power management circuit 202 and the battery charging circuit 204.

Accordingly, certain aspects of the present disclosure provide techniques and apparatus for trickle charging a multi-cell-in-series battery with a battery charger that lacks a trickle charger and a battery switch (e.g., transistor QBAT2). Instead, the battery charger may be provided with three alternative power supply rails.

Figure 3A:
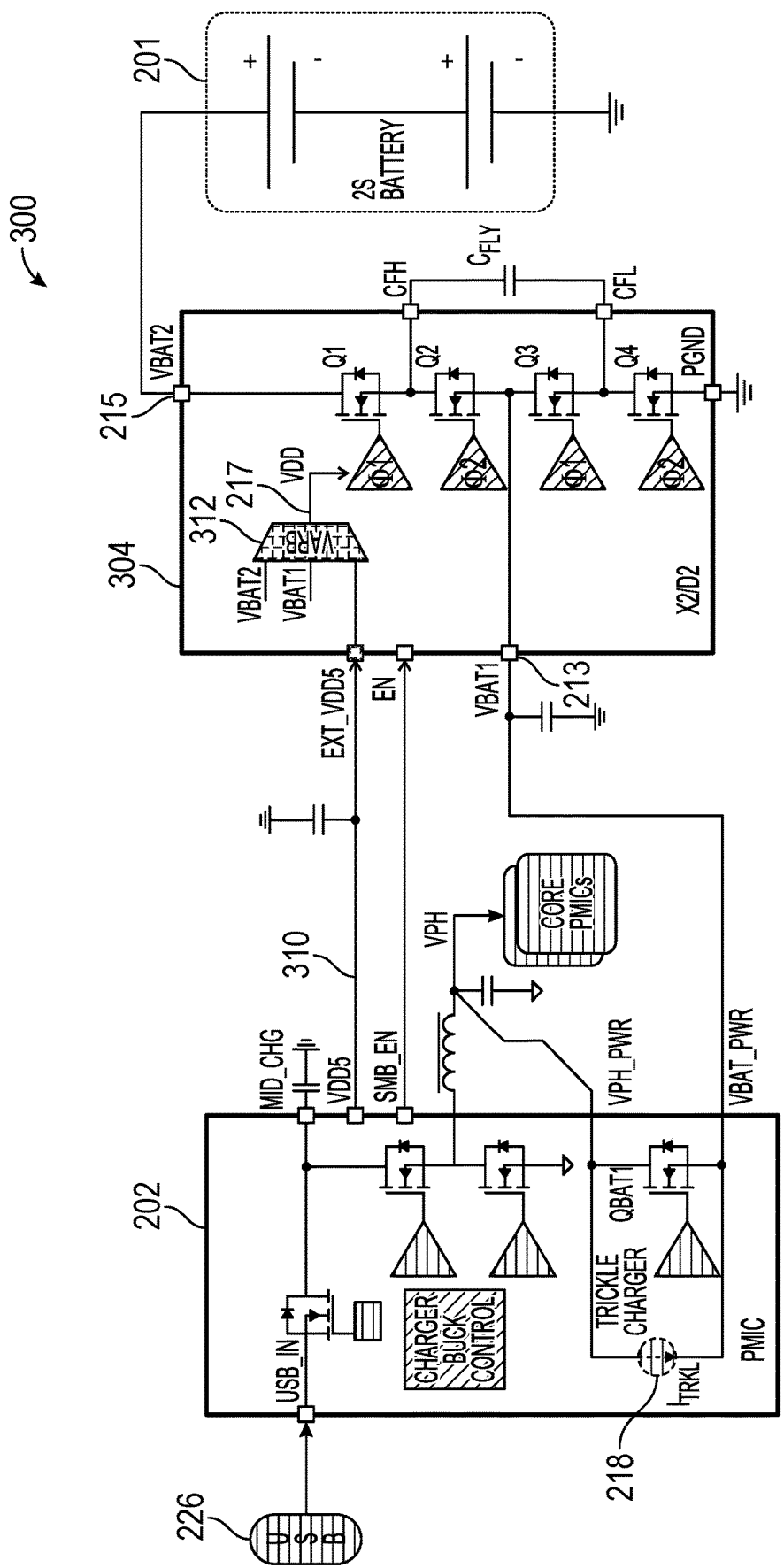
FIG. 3A is a schematic diagram of an example power supply system capable of trickle charging a dead battery using a battery charging circuit with three alternative power supply rails and without a trickle charger or a battery switch, in accordance with certain aspects of the present disclosure.

FIG. 3A is a schematic diagram of an example power supply system 300, in accordance with certain aspects of the present disclosure. As shown, the example power supply system 300 is capable of trickle charging a dead two-cell-in-series (2S) battery, although it is to be understand that the scope of the present disclosure includes batteries with more than two cells (e.g., three-cell-in-series (3S), four-cell-in-series (4S) batteries, or n-cell-in-series, where n is any integer greater than 1) and a battery charging circuit (e.g., X3D3, X4D4, or XnDn) capable of charging and/or discharging such an n-cell-in-series battery.

In the power supply system 300, the battery charging circuit 304 is provided with a third power supply voltage node 310 (labeled "VDD5"), which may be used during trickle charging of the dead battery 201. When both the first power supply voltage (e.g., VBAT1) and the second power supply voltage (e.g., VBAT2) are low, this third power supply voltage (VDD5) can supply the analog and digital circuits of the battery charging circuit 304 to allow operation thereof. This third power supply voltage may be provided from the power management circuit 202 (e.g., the PMIC 124) or may be provided from a power source (e.g., an LDO or SMPS (buck, boost, etc.) outside of the power management circuit. As an example, the third power supply voltage may be the same as the driver power supply for the power management circuit's own SMPS (e.g., VDD5 may be used to power the gate drivers 216).

The battery charging circuit 304 in FIG. 3A may include an arbiter 312 configured to select between three alternative power supply rails (e.g., VBAT1, VBAT2, and VDD5). Control logic (not shown) may control the arbiter 312 to select which power level to output at the common power supply node 217. However, the battery charging circuit 304 in FIG. 3A may not include a trickle charger (e.g., trickle charger 208) or a battery switch (e.g., transistor QBAT2). Rather, the drain of transistor Q1 may be coupled to the second power supply node 215 (VBAT2).

Figure 3B:
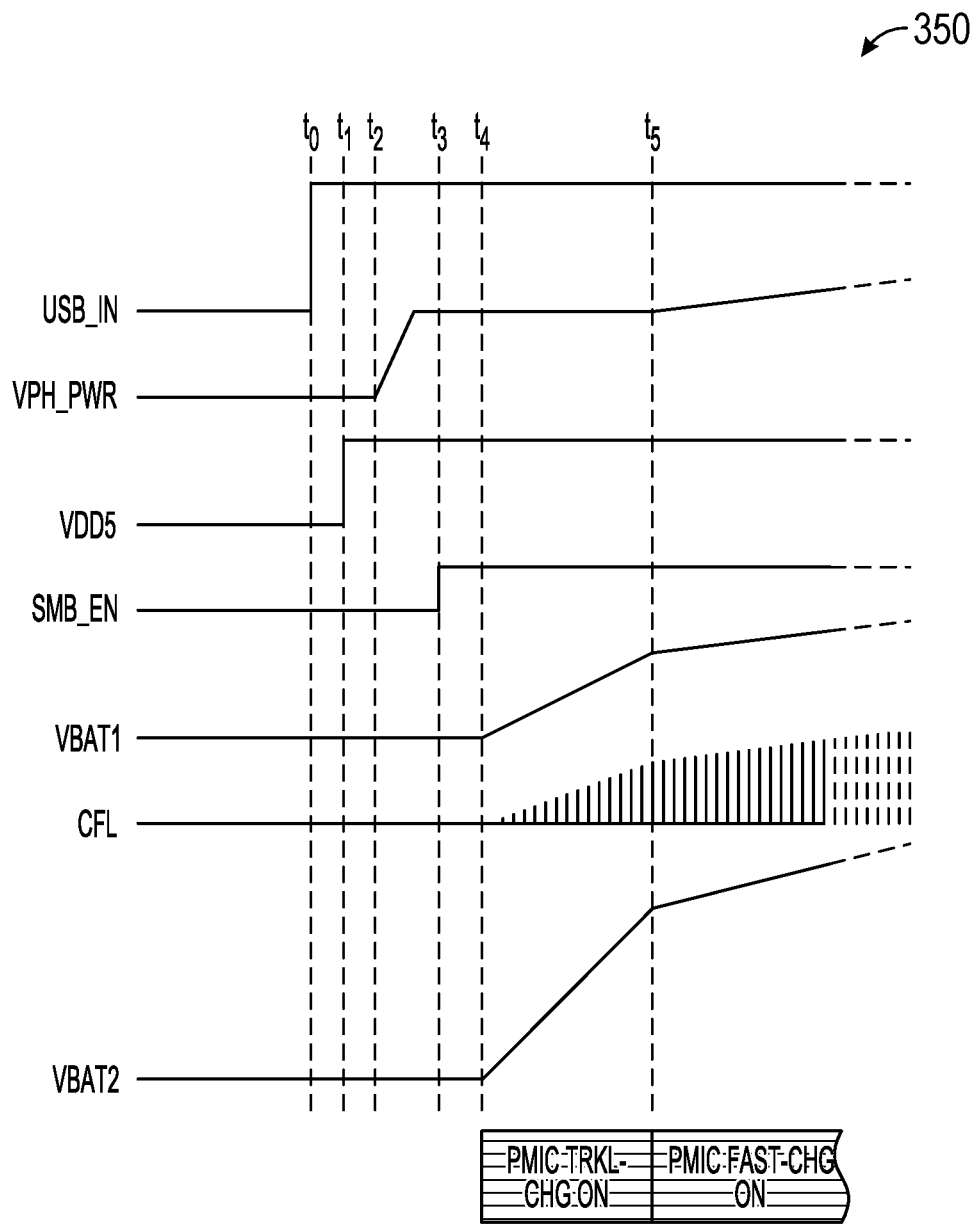
FIG. 3B is a timing diagram illustrating trickle charging the dead battery using the power supply system of FIG. 3A, in accordance with certain aspects of the present disclosure.

FIG. 3B is a timing diagram 350 illustrating trickle charging a dead multi-cell battery 201 (e.g., a dead 2S battery) using the power supply system 300 of FIG. 3A, in accordance with certain aspects of the present disclosure. Initially, VBAT1 and VBAT2=0 V (dead battery), and then at time $t_0$, a power source capable of charging the multi-cell battery 201 is provided. For example, a user may plug in a wall adapter or other power cable (e.g., USB). The third power supply voltage (e.g., VDD5) may be generated at time $t_1$. For certain aspects, the power management circuit 202 generates the third power supply voltage, while in other aspects, the third power supply voltage is supplied by another circuit. At time $t_2$ (which may occur before or after time $t_1$), the power management circuit 202 may bring up VPH_PWR to boot the system, using the buck converter of FIG. 3A, for example. At time $t_3$, the power management circuit 202 may also enable the battery charging circuit 304 with the transition of an enable signal (e.g., SMB_EN changing from logic low to logic high). The power management circuit 202 trickle charges up VBAT_PWR (VBAT1 for the battery charger) starting at time $t_4$ using the trickle charger 218, with a trickle charge current $I_{TRKL}$. Concurrently with VBAT_PWR (VBAT1) being trickle charged, the battery charging circuit 304 operates with the third supply voltage (VDD5) and trickle charges the multi-cell battery 201 with half the trickle charge current ($I_{TRKL}/2$), which also slowly brings up VBAT2. When the second power supply voltage (e.g., VBAT2) reaches the fast-charge threshold (e.g., 2×VBAT1) at time $t_5$, fast charging may begin. Therefore, trickle charging in this manner involves two states: power management circuit trickle charging simultaneously with battery charging circuit trickle charging between times $t_4$ and $t_5$, followed by normal charging (e.g., fast charging) after time $t_5$.

Trickle charging using the power supply system 300 of FIG. 3A may provide some advantages over trickle charging using the power supply system 200 of FIG. 2A. For example, no battery switch (e.g., transistor QBAT2) is used in the battery charging circuit 304, thereby saving the area consumption and power loss during discharging of the battery 201. Furthermore, no trickle charger is used in the battery charging circuit 304, thus reducing the occupied semiconductor area and cost. Moreover, this trickle-charging scheme in power supply system 300 may be considered to be simpler and more straightforward, without the back-and-forth handshaking between the power management circuit and the battery charging circuit.

Example Operations

Figure 4:
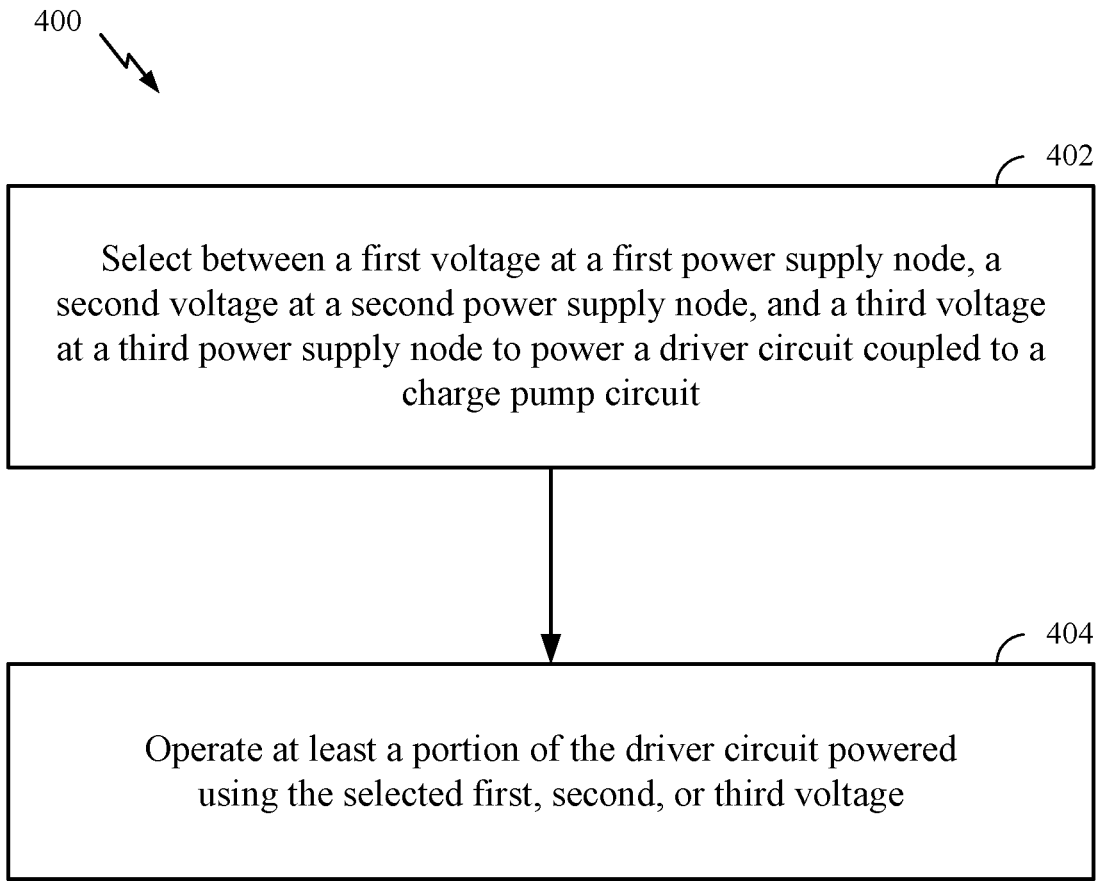
FIG. 4 is a flow diagram of example operations for supplying power, in accordance with certain aspects of the present disclosure.
Figure 5:
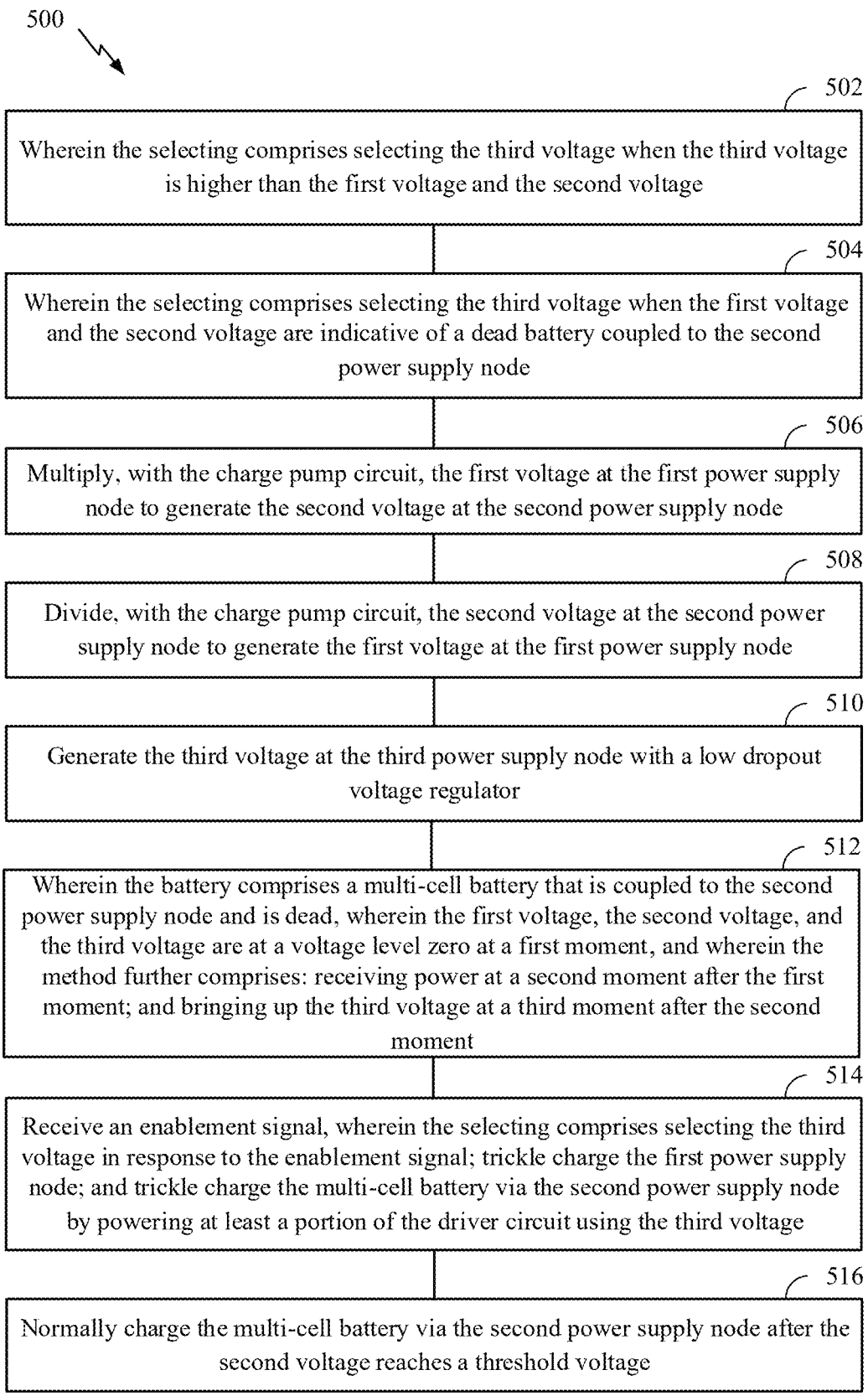
FIG. 5 is a flow diagram of example operations for supplying power, in accordance with certain aspects of the present disclosure.

FIG. 4 is a flow diagram of example operations 400 for supplying power, in accordance with certain aspects of the present disclosure. The operations 400 may be performed by a power supply system (e.g., the power supply system 300 of FIG. 3A). FIG. 5 is a flow diagram of example operations 500 for supplying power, in accordance with certain aspects of the present disclosure.

The operations 400 may begin, at block 402, with the power supply system selecting between a first voltage (e.g., VBAT1) at a first power supply node (e.g., first power supply node 213), a second voltage (e.g., VBAT2) at a second power supply node (e.g., second power supply node 215), and a third voltage (e.g., VDD5) at a third power supply node (e.g., third power supply voltage node 310) to power a driver circuit (e.g., driver circuit 207) coupled to a charge pump circuit (e.g., charge pump circuit 206). At block 404, the power supply system may operate at least a portion of the driver circuit (e.g., gate drivers for transistors Q1 and Q2), which may be powered using the selected first, second, or third voltage.

According to certain aspects, the selecting at block 402 includes selecting the third voltage when the third voltage is higher than the first voltage and the second voltage (e.g., block 502).

According to certain aspects, the selecting at block 402 includes selecting the third voltage when the first voltage and the second voltage are indicative of a dead battery (e.g., multi-cell battery 201) coupled to the second power supply node (e.g., block 504).

According to certain aspects, the operations further involve at least one of: the charge pump circuit multiplying the first voltage at the first power supply node to generate the second voltage at the second power supply node (e.g., block 506); or the charge pump circuit dividing the second voltage at the second power supply node to generate the first voltage at the first power supply node (e.g., block 508).

According to certain aspects, the operations 400 further include generating the third voltage at the third power supply node with a voltage regulator (e.g., an LDO, block 510).

According to certain aspects (e.g., block 512), a multi-cell battery (e.g., multi-cell battery 201) coupled to the second power supply node is dead. In this case, the first, second, and third voltages may be zero at a first moment (e.g., at a time before time $t_0$). The operations 400 may further involve receiving power at a second moment (e.g., at time $t_0$) after the first moment and bringing up the third voltage at a third moment (e.g., at time $t_1$) after the second moment. For certain aspects, the operations 400 further include receiving an enablement signal (e.g., SMB_EN). In this case, the selecting at block 402 may involve selecting the third voltage in response to the enablement signal. For certain aspects (e.g., block 514), the operations 400 may further include trickle charging the first power supply node and trickle charging the battery via the second power supply node by powering at least a portion of the driver circuit using the third voltage. For certain aspects (e.g., block 516), the operations 400 may further include normally charging (e.g., fast charging, as opposed to trickle charging) the battery via the second power supply node after the second voltage reaches a threshold voltage (e.g., 2×VBAT1).

Example Aspects

In addition to the various aspects described above, specific combinations of aspects are within the scope of the disclosure, some of which are detailed below:

Aspect 1: A battery charging circuit comprising: a charge pump circuit comprising a plurality of switches and a capacitive element, being coupled to a first power supply node and a second power supply node, and being configured to at least one of: multiply a first voltage at the first power supply node to generate a second voltage at the second power supply node; or divide the second voltage at the second power supply node to generate the first voltage at the first power supply node; a driver circuit coupled to the charge pump circuit and configured to drive the plurality of switches in the charge pump circuit; and an arbiter having a first input coupled to the first power supply node, a second input coupled to the second power supply node, a third input coupled to a third power supply node having a third voltage, and an output coupled to a power supply terminal of the driver circuit, the arbiter being configured to select between the first voltage, the second voltage, and the third voltage to power the driver circuit.

Aspect 2: The battery charging circuit of Aspect 1, wherein the arbiter is configured to select the third voltage when the third voltage is higher than the first voltage and the second voltage.

Aspect 3: The battery charging circuit of Aspect 1 or 2, wherein the arbiter is configured to select the third voltage when the first voltage and the second voltage are indicative of a dead battery coupled to the second power supply node.

Aspect 4: The battery charging circuit of any preceding Aspect, wherein the plurality of switches in the charge pump circuit comprises: a first switch coupled between the second power supply node and a first terminal of the capacitive element; a second switch coupled in series with the first switch and coupled between the first terminal of the capacitive element and the first power supply node; a third switch coupled in series with the second switch and coupled between the first power supply node and a second terminal of the capacitive element; and a fourth switch coupled in series with the third switch and coupled between the second terminal of the capacitive element and a reference potential node.

Aspect 5: The battery charging circuit of Aspect 4, wherein the first switch is connected to the second power supply node.

Aspect 6: The battery charging circuit of Aspect 4 or 5, wherein the battery charging circuit lacks a trickle charger between the first switch and the second power supply node.

Aspect 7: The battery charging circuit of any of Aspects 4-6, wherein the battery charging circuit lacks a fifth switch between the first switch and the second power supply node.

Aspect 8: The battery charging circuit of any of Aspects 4-7, wherein: the first, second, third, and fourth switches are implemented by first, second, third, and fourth transistors, respectively; a drain of the second transistor is coupled to a source of the first transistor; a drain of the third transistor is coupled to a source of the second transistor; and a drain of the fourth transistor is coupled to a source of the third transistor.

Aspect 9: The battery charging circuit of Aspect 8, wherein the first, second, third, and fourth transistors comprise n-type metal-oxide-semiconductor (NMOS) transistors.

Aspect 10: The battery charging circuit of any preceding Aspect, wherein the second power supply node is configured to couple to a terminal of a multi-cell battery.

Aspect 11: The battery charging circuit of any preceding Aspect, wherein the first power supply node is configured to couple to an output of a switched-mode power supply circuit.

Aspect 12: The battery charging circuit of any preceding Aspect, wherein the charge pump circuit is configured to at least one of: double the first voltage at the first power supply node to generate the second voltage at the second power supply node; or half the second voltage at the second power supply node to generate the first voltage at the first power supply node.

Aspect 13: A power supply system comprising the battery charging circuit of any of Aspects 1-10 and 12, the power supply system further comprising a power management circuit, the power management circuit having a switched-mode power supply circuit with an output coupled to the first power supply node of the battery charging circuit.

Aspect 14: The power supply system of Aspect 13, further comprising a voltage regulator having an output coupled to the third power supply node and configured to generate the third voltage.

Aspect 15: The power supply system of Aspect 13, wherein the power management circuit is configured to generate the third voltage.

Aspect 16: The power supply system of any of Aspects 13-15, further comprising a switch coupled between the output of the switched-mode power supply circuit and the first power supply node.

Aspect 17: The power supply system of Aspect 16, further comprising a trickle charger coupled in parallel with the switch and coupled between the output of the switched-mode power supply circuit and the first power supply node.

Aspect 18: A wireless device comprising the battery charging circuit of any of Aspects 1-9, 11, and 12, the wireless device further comprising a multi-cell battery coupled to the second power supply node of the battery charging circuit.

Aspect 19: A method of supplying power, comprising: selecting between a first voltage at a first power supply node, a second voltage at a second power supply node, and a third voltage at a third power supply node to power a driver circuit coupled to a charge pump circuit; and operating at least a portion of the driver circuit powered using the selected first, second, or third voltage.

Aspect 20: The method of Aspect 19, wherein the selecting comprises selecting the third voltage when the third voltage is higher than the first voltage and the second voltage.

Aspect 21: The method of Aspect 19 or 20, wherein the selecting comprises selecting the third voltage when the first voltage and the second voltage are indicative of a dead battery coupled to the second power supply node.

Aspect 22: The method of any of Aspects 19-21, further comprising multiplying, with the charge pump circuit, the first voltage at the first power supply node to generate the second voltage at the second power supply node.

Aspect 23: The method of any of Aspects 19-21, further comprising dividing, with the charge pump circuit, the second voltage at the second power supply node to generate the first voltage at the first power supply node.

Aspect 24: The method of any of Aspects 19-23, further comprising generating the third voltage at the third power supply node with a low dropout voltage regulator.

Aspect 25: The method of any of Aspects 19, 20, and 22-24, wherein a multi-cell battery coupled to the second power supply node is dead, wherein the first, second, and third voltages are zero at a first moment, and wherein the method further comprises: receiving power at a second moment after the first moment; and bringing up the third voltage at a third moment after the second moment.

Aspect 26: The method of Aspect 25, further comprising: receiving an enablement signal, wherein the selecting comprises selecting the third voltage in response to the enablement signal; trickle charging the first power supply node; and trickle charging the battery via the second power supply node by powering at least a portion of the driver circuit using the third voltage.

Aspect 27: The method of Aspect 26, further comprising normally charging the battery via the second power supply node after the second voltage reaches a threshold voltage.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation, and details of the methods and apparatus described above without departing from the scope of the claims.

What is claimed is:

1. A battery charging circuit comprising:
    a charge pump circuit comprising a plurality of switches and a capacitive element, being coupled to a first power supply node and a second power supply node, and being configured to at least one of:
        multiply a first voltage at the first power supply node to generate a second voltage at the second power supply node; or
        divide the second voltage at the second power supply node to generate the first voltage at the first power supply node;
    a driver circuit coupled to the charge pump circuit and configured to drive the plurality of switches in the charge pump circuit; and
    an arbiter having a first input coupled to the first power supply node, a second input coupled to the second power supply node, a third input coupled to a third power supply node having a third voltage, and an output coupled to a power supply terminal of the driver circuit, the arbiter being configured to select between the first voltage, the second voltage, and the third voltage to power the driver circuit, wherein the second power supply node is configured to couple to a terminal of a battery, and wherein the plurality of switches in the charge pump circuit comprises:
        a first switch coupled between the second power supply node and a first terminal of the capacitive element;
        a second switch coupled in series with the first switch and coupled between the first terminal of the capacitive element and the first power supply node;
        a third switch coupled in series with the second switch and coupled between the first power supply node and a second terminal of the capacitive element; and
        a fourth switch coupled in series with the third switch and coupled between the second terminal of the capacitive element and a reference potential node.

2. The battery charging circuit of claim 1, wherein the arbiter is configured to select the third voltage when the third voltage is higher than the first voltage and the second voltage.

3. The battery charging circuit of claim 1, wherein the arbiter is configured to select the third voltage when the first voltage and the second voltage are indicative of a dead battery coupled to the second power supply node.

4. The battery charging circuit of claim 1, wherein the first switch is connected to the second power supply node and wherein the second power supply node is connected to the terminal of the battery.

5. The battery charging circuit of claim 1, wherein the battery charging circuit lacks a trickle charger between the first switch and the second power supply node.

6. The battery charging circuit of claim 1, wherein the battery charging circuit lacks a fifth switch between the first switch and the second power supply node.

7. The battery charging circuit of claim 1, wherein the second power supply node is configured to couple to a terminal of a multi-cell battery.

8. The battery charging circuit of claim 1, wherein the first power supply node is configured to couple to an output of a switched-mode power supply circuit.

9. The battery charging circuit of claim 1, wherein the charge pump circuit is configured to at least one of:
    double the first voltage at the first power supply node to generate the second voltage at the second power supply node; or half the second voltage at the second power supply node to generate the first voltage at the first power supply node.

10. A wireless device comprising the battery charging circuit of claim 1, the wireless device further comprising a multi-cell battery coupled to the second power supply node of the battery charging circuit.

11. The battery charging circuit of claim 1, wherein:
    the first, second, third, and fourth switches are implemented by first, second, third, and fourth transistors, respectively;
    a drain of the first transistor is coupled to the second power supply node;
    a drain of the second transistor is coupled to a source of the first transistor;
    a drain of the third transistor is coupled to a source of the second transistor; and
    a drain of the fourth transistor is coupled to a source of the third transistor.

12. The battery charging circuit of claim 11, wherein the first, second, third, and fourth transistors comprise n-type metal-oxide-semiconductor (NMOS) transistors.

13. A power supply system comprising the battery charging circuit of claim 1, the power supply system further comprising a power management circuit, the power management circuit having a switched-mode power supply circuit with an output coupled to the first power supply node of the battery charging circuit.

14. The power supply system of claim 13, further comprising a voltage regulator having an output coupled to the third power supply node and configured to generate the third voltage.

15. The power supply system of claim 13, wherein the power management circuit is configured to generate the third voltage.

16. The power supply system of claim 13, further comprising a switch coupled between the output of the switched-mode power supply circuit and the first power supply node.

17. The power supply system of claim 16, further comprising a trickle charger coupled in parallel with the switch and coupled between the output of the switched-mode power supply circuit and the first power supply node.

18. A method of supplying power, comprising:
- selecting between a first voltage at a first power supply node, a second voltage at a second power supply node for coupling to a terminal of a battery, and a third voltage at a third power supply node to power a driver circuit coupled to a charge pump circuit, wherein the charge pump circuit includes a plurality of switches and a capacitive element and wherein the plurality of switches comprise:
  - a first switch coupled between the second power supply node and a first terminal of the capacitive element;
  - a second switch coupled in series with the first switch and coupled between the first terminal of the capacitive element and the first power supply node;
  - a third switch coupled in series with the second switch and coupled between the first power supply node and a second terminal of the capacitive element; and
  - a fourth switch coupled in series with the third switch and coupled between the second terminal of the capacitive element and a reference potential node; and
- operating at least a portion of the driver circuit powered using the selected first, second, or third voltage.

19. The method of claim 18, wherein the selecting comprises selecting the third voltage when the third voltage is higher than the first voltage and the second voltage.

20. The method of claim 18, wherein the selecting comprises selecting the third voltage when the first voltage and the second voltage are indicative of a dead battery coupled to the second power supply node.

21. The method of claim 18, further comprising multiplying, with the charge pump circuit, the first voltage at the first power supply node to generate the second voltage at the second power supply node.

22. The method of claim 18, further comprising dividing, with the charge pump circuit, the second voltage at the second power supply node to generate the first voltage at the first power supply node.

23. The method of claim 18, further comprising generating the third voltage at the third power supply node with a low dropout voltage regulator.

24. The method of claim 18, wherein the battery comprises a multi-cell battery that is coupled to the second power supply node and is dead, wherein the first voltage, the second voltage, and the third voltage are at a voltage level at a first moment, and wherein the method further comprises:
- receiving power at a second moment after the first moment; and
- bringing up the third voltage at a third moment after the second moment.

25. The method of claim 24, further comprising:
- receiving an enablement signal, wherein the selecting comprises selecting the third voltage in response to the enablement signal;
- trickle charging the first power supply node; and
- trickle charging the multi-cell battery via the second power supply node by powering at least a portion of the driver circuit using the third voltage.

26. The method of claim 25, further comprising normally charging the multi-cell battery via the second power supply node after the second voltage reaches a threshold voltage.

* * * * *